United States Patent [19]

Overbeck

[11] Patent Number: 4,532,402
[45] Date of Patent: Jul. 30, 1985

[54] METHOD AND APPARATUS FOR POSITIONING A FOCUSED BEAM ON AN INTEGRATED CIRCUIT

[75] Inventor: James W. Overbeck, Hingham, Mass.
[73] Assignee: XRL, Inc., Hingham, Mass.
[21] Appl. No.: 529,025
[22] Filed: Sep. 2, 1983
[51] Int. Cl.³ .................. B23K 26/02; B23K 26/08
[52] U.S. Cl. .................. 219/121 LU; 219/121 LW; 219/121 LQ; 219/121 L; 219/121 LY
[58] Field of Search .................. 219/121 LU, 121 LW, 219/121 LQ, 121 LR, 121 L, 121 LM, 121 LY, 121 LX

[56] References Cited

U.S. PATENT DOCUMENTS 3,716,716  2/1973  Marantette et al. ............... 250/233
3,900,737  8/1975  Collier et al. .................... 250/492 A
4,131,484  12/1978  Caruso et al. ............ 219/121 LM X

OTHER PUBLICATIONS

Fisher et al., *Teradyne*, "Laser Trimming of Monolithic Analog LSI Devices", 1980.
"A 330 Teradyne Monolithic Trim System", 1981.

*Primary Examiner*—C. L. Albritton
*Attorney, Agent, or Firm*—Lahive & Cockfield

[57] ABSTRACT

An apparatus for accurately positioning a laser beam on a semiconductor surface, for example for repairing an integrated circuit, has a translational beam positioning apparatus and a galvanometer based beam positioning apparatus. The translational beam positioning apparatus has first and second platform members, the second platform member moving relative to the first platform member and supporting the galvanometer system. The galvanometer beam positioning system thus moves with the second platform member to cover the surface of an integrated circuit on which "repair" is to be performed. The second platform member further supports an optical system positioned relative to the galvanometer beam positioning system so that a small and uniform spot size can be achieved, at high speed, using small galvanometer mirrors. Thereby, the galvanometer beam positioning system provides high speed movement of a laser beam over a relatively small area and the translational system provides broad, highly accurate, but slower movement of the entire system across the entire integrated circuit. A method for calibrating the galvanometer system employs apparatus for measuring the exact position of the translational system. A comparison of feature measurements using both the translational system and the galvanometer system enables accurate and reliable calibration of the galvanometer system.

13 Claims, 14 Drawing Figures

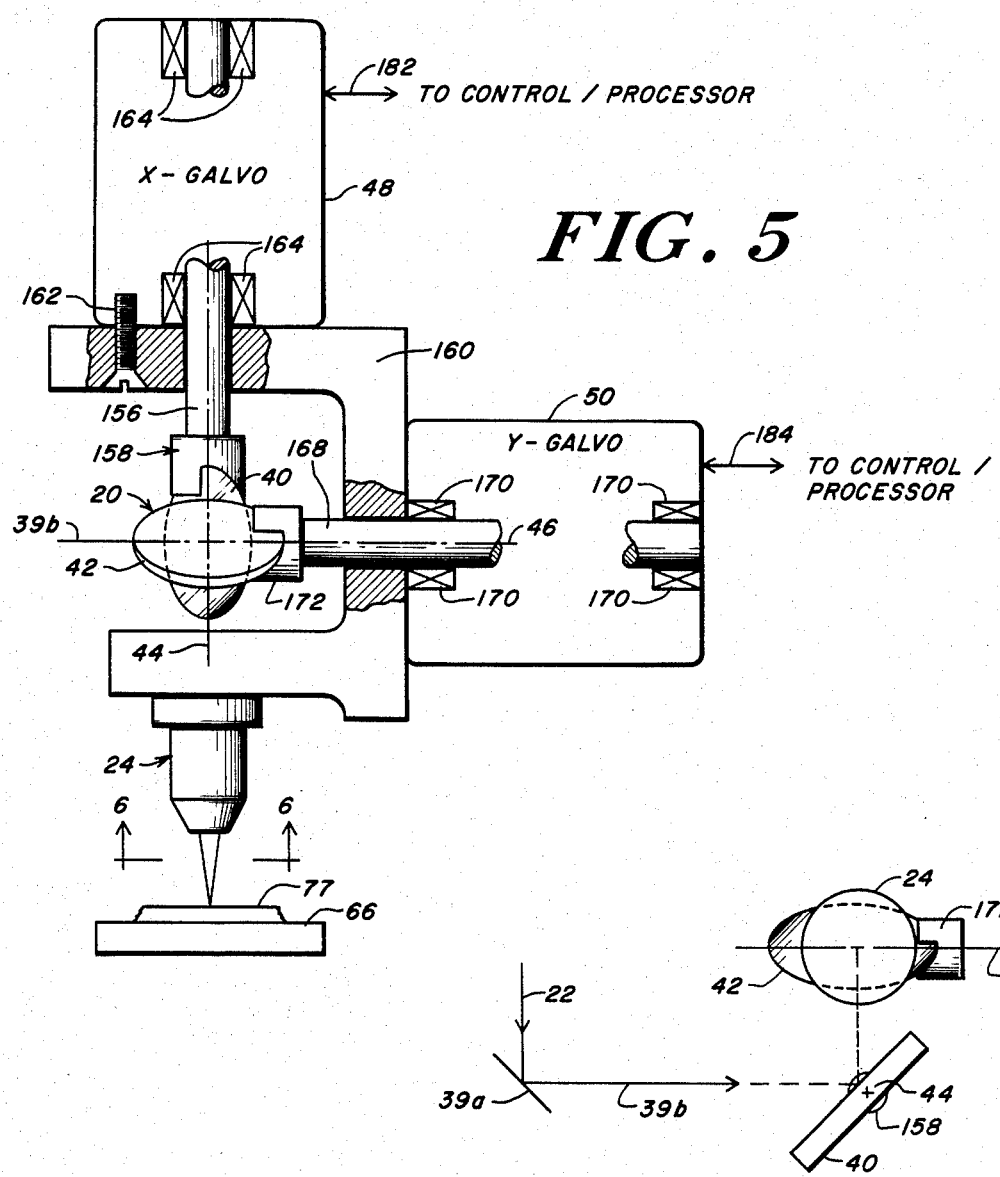
FIG. 5
FIG. 6
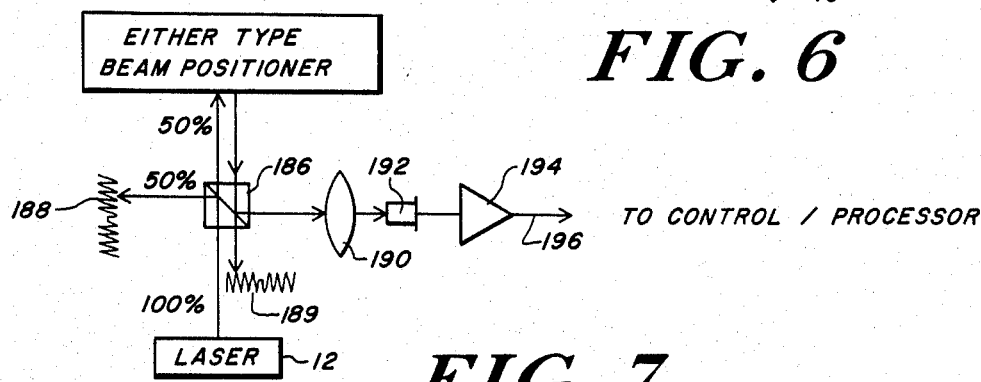
FIG. 7

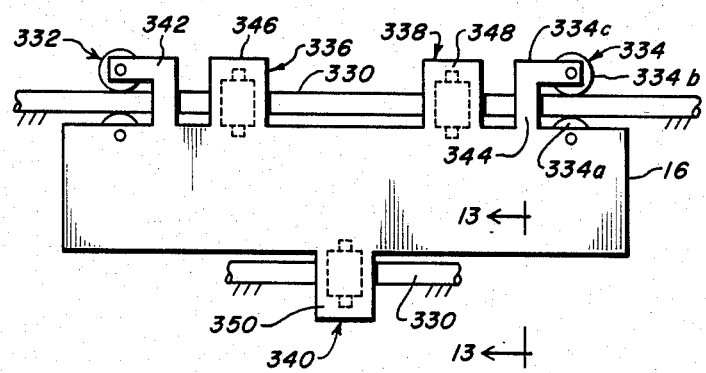
FIG. 11
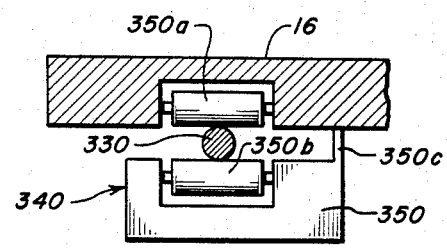
FIG. 12
FIG. 13
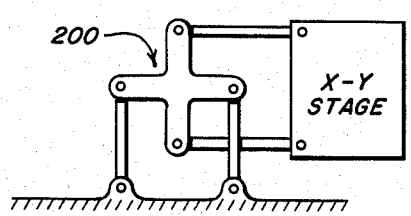
FIG. 14

METHOD AND APPARATUS FOR POSITIONING A FOCUSED BEAM ON AN INTEGRATED CIRCUIT

BACKGROUND OF THE INVENTION

The invention relates generally to a method and apparatus for accurately positioning a focused energy beam, and in particular to a method and apparatus for positioning a focused laser beam, very precisely and at high speed, over a complex integrated circuit surface.

When integrated circuits are manufactured, many of the circuits are defective and until recently were disposed of as being uncorrectable. The ratio of the good circuits to the total number of circuits manufactured, often termed the yield of a manufacturing process, is very important to the profitability of a semiconductor manufacturing operation. The higher the yield, the greater the profitability of the operation. As circuits become more and more sophisticated, and correspondingly as the number of elements forming a semiconductor circuit increases, the likelihood of a circuit being defective increases. Consequently, the yield decreases and profitability decreases and/or the price of the more sophisticated semiconductor integrated circuits increases.

Often, it is the failure of only a few of the tens or hundreds of thousands of circuit elements, that is, diodes, transistors, etc., within the integrated circuit that cause the entire circuit to be thrown away. Recently, however, with respect to very regular integrated circuits such as memories, integrated circuit manufacturers have included spare circuit elements on the semiconductor chip. Thus, when an integrated circuit is tested prior to encapsulation, a defective element can be replaced by severing the connection thereto and connecting a spare in its place. This process, called memory repair, improves the yield of complex semiconductor circuits dramatically, for example by a factor of two or three.

The preferred method for severing connections in the integrated circuit is vaporization, that is, the fine conductors connecting the element to the rest of the circuit are vaporized using a focused laser beam. The conductors are usually several micrometers wide and fabricated of metal or polycrystalline silicon. The laser beam must be aimed with great precision at the semiconductor surface; and the focused spot must be very small, on the order of the width of the conductor being vaporized, so that adjacent conductors are not damaged.

At present, the positioning accuracy and spot size required by integrated circuit manufacturers strain the capability of the equipment that is commercially available. As integrated circuit feature dimensions grow smaller, the strain upon present equipment will become even greater. In addition, the integrated circuit overall dimensions are increasing, which, as described below, yet further strain the capability of present commercial equipment.

The commercially available equipment which can be employed for "repair" of the integrated circuit, to increase yield, falls into one of two general classes. In accordance with one class, the "X-Y beam positioner", a lens moves in an X-Y coordinate system over the surface of the integrated circuit. The lens must be positioned directly over the conductor to be severed during the vaporization process. A pair of mirrors are also provided. One mirror moves in one dimension (for example the X direction) only, and the other, fixed relative to the lens, moves in two dimensions (X and Y). Together, the mirrors direct a collimated beam from a fixed laser onto the movable lens. While this system provides high accuracy and small spot size, it is either relatively slow because of a high inertial weight required to minimize vibration of the moving parts; or the vibration resulting from a lower weight construction provides a limit on spot size which is insufficient for future integrated circuit repair applications (as discussed further below).

A second class of commercially available equipment, designated the "galvo beam positioner", consists of a fixed lens and a pair of rotating mirrors which change the direction of the collimated light incident thereon from a fixed laser. The laser beam source is directed by the mirrors through the fixed lens toward the semiconductor surface at a designated and changeable angle controlled by the angular positions of the mirrors. The lens transforms the changing direction of light entering its optics into a changing position of a focused beam on the integrated circuit surface. In this commercial equipment, the mirrors are rotated, and hence positioned, through angles determined by the limited angular field of the lens, by galvanometer motors, often referred to as "galvos". While the galvo beam positioner is much faster than the X-Y beam positioner because it has much less inertia, and is vibration free, it does not have the necessary accuracy, spot size, or field of view required by those more sophisticated circuit configurations which have a relatively large surface area. These downside factors exist first because the angular position transducers are not accurate enough when their moment of inertia, and therefore their diameter, is small, and second, because of the demand placed upon lens design and manufacturing for a lens having a high ratio of field size to spot size, for example on the order of 1,000 to 10,000 or more. Thus, in the galvo beam positioner, small spot size conflicts with the large field of view required to cover the entire, and presently growing, size of integrated circuits. (The conflict exists because the angular position errors can be reduced by reducing lens focal length but reduced focal length conflicts with the requirement of a large field of view.)

The X-Y positioner on the other hand, meets the needs of memory repair in that its field is large enough, and its spot size has adequate uniformity over the entire field. In addition, its accuracy is sufficient if the design is well engineered and the equipment is operated slowly enough to avoid positioning errors. It has however much more inertia than the galvo beam positioner and is therefore much slower in operation. Practically then, the throughput (repairs per hour) of the X-Y positioner is potentially much less than the galvo beam positioner. In order to minimize this disadvantage, the X-Y positioner is often designed to be lightweight. The lightweight design however reduces the positioner's rigidity and increases its vibration. Thus, while it becomes faster in settling within one limit of error (0.25 millimeters, for example), it becomes slower in settling within much lower limits, (for example, 0.001 millimeters), due to vibration. Thus at the lower limit, the vibration problem has the effect of limiting the effective positioning accuracy. Furthermore, vibration becomes even more of a limitation because no one has yet produced an X-Y beam positioner which is symmetric and dynamically balanced. On the other hand, it is relatively easier to mount mirrors to galvanometers so that the galvo beam positioner is dynamically balanced.

The X-Y beam positioner also experiences vibration and other repeatability errors in the direction parallel to the optical axis of the lens (i.e. normal to the surface of the integrated circuit). This affects the focus of the laser on the integrated circuit surface. Thus, as the spot size at the surface becomes smaller, for a given wavelength of light, the depth of field decreases and vibration in the direction of the optical axis begins to cause variations in spot size so that the focus, in effect, varies. This sets a limit to the spot size presently obtainable with commercial X-Y beam positioners because those units now in use must be lightweight to compete, commercially (and with respect to speed), with the galvanometer systems. It furthermore turns out that the spot size limitation of commercial X-Y positioners is very close to the limit experienced by the present galvanometer beam positioners. In the galvo systems, however, the causes are completely different and include variation of spot size over the field of view.

It is therefore a primary object of the invention to avoid the disadvantages of both the X-Y beam positioning system and the galvanometer beam positioning system while maintaining the advantages of both.

Other objects of the invention are providing a method and apparatus for positioning a focused laser beam on an integrated circuit with very high accuracy, small spot size which is uniform over the entire field of the integrated circuit, larger field size than is presently obtainable with commercial galvanometer beam positioners, high speed, minimum vibration, and high reliability.

SUMMARY OF THE INVENTION

The invention relates to an apparatus and method for accurately positioning focused energy on a semiconductor integrated circuit surface. The apparatus features a beam source of electromagnetic energy, typically a laser source, a movable platform assembly, and drive elements for moving the platform assembly in first and second directions parallel to a movement plane. The movement plane is generally parallel to the semiconductor surface. Typically, the first and second directions will correspond to an X-Y coordinate system, however any coordinate system which covers the entire field in a deterministic manner can be employed.

The invention further features a rotatable mirror assembly which is supported by the platform assembly for deflecting energy incident thereon from the beam source to a direction whereby the energy passes through an optical system for focusing the deflected beam on the semiconductor surface. The optical system is also supported by the platform assembly. A control processor controls and accurately positions the platform assembly and the mirror assembly for directing the beam source onto selected areas of the semiconductor surface as a cell of focused energy. Preferably, the mirror assembly has a first and a second rotatable mirror subsystem supported by the platform assembly and controlled by the control processor.

In a preferred embodiment of the invention, the platform assembly includes a first and a second movable platform member. The second platform member is supported by and movable on the first platform member and separate drive elements are provided for moving the respective platform members in the first and the second movement directions. Both the optical system and the mirror assembly are then carried by the second platform member for movement relative to the first platform member.

In another aspect, the first rotatable mirror mentioned above has a single axis of rotation which is substantially normal to the movement plane. The second rotatable mirror is capable of rotation about an axis parallel to the movement plane.

The control processor features a positioning data processor, and the first platform member moving assembly is responsive to a first platform position control signal from the data processor for accurately moving the first platform member to a specified location. Similarly, the second platform member moving assembly responds to the data processor for moving the second platform member to a specific location. In a like manner, a first and a second mirror drive circuitry accurately control the angular position of the respective mirrors in response to control signals from the data processor.

In a preferred implementation of the invention, there are provided mechanical mounting elements for mounting the first and second platform member drive assemblies in a fixed position. The output of those drive assemblies are advantageously coupled to the first and second platform members.

The invention further features circuitry for accurately determining the position of the first and second platform members relative to a fixed reference. Preferably interferometer measuring equipment can be employed for this purpose.

By using the claimed invention, a commercially available lens can be employed. The lens element can have a field of view of less than two millimeters and a focal length of less than 20 millimeters. The use of a commercially available lens provides for a relatively inexpensive lens of very high quality.

In another aspect of the invention there is featured a method for calibrating the mirror assembly used for deflecting the beam source over the field of view. The method features the steps of accurately positioning a reference surface having well defined features (and which can be the semiconductor surface) in the plane of the semiconductor surface; measuring at least one surface feature of the reference surface by moving the platform assembly while maintaining the rotatable mirror assembly in a fixed position relative to the optical system; and then, measuring the same feature on the reference surface by maintaining the platform assembly in a stationary position and moving the rotatable mirror assembly to perform the measurement. The platform assembly originated measurement is then compared with the rotatable mirror assembly originated measurements for calibrating the rotatable mirror assembly. This method is accurate and effective because the position of the platform assembly can be accurately determined for example, in the X and Y directions, by using interferometer techniques.

Preferably, the method further features the steps of aligning the surface feature with a movement axis of the platform assembly and then measuring the feature substantially solely along one movement axis by movement of the platform assembly in that direction and thereafter measuring the same feature substantially solely along same movement axis by movement of the mirror assembly whereby calibration of the mirror assembly along that single movement direction or axis is achieved.

BRIEF DESCRIPTION OF THE DRAWINGS

Other objects, features, and advantages of the invention will be apparent from the following description of preferred particular embodiments of the invention taken together with the drawings in which:

FIG. 5 is an elevation view of the mirror galvo assembly and optical system according to the invention;

FIG. 6 is a bottom view of the optical assembly and galvo mirrors along lines 6—6 of FIG. 5;

FIG. 7 is a schematic representation of the feature measurement apparatus;

FIG. 11 represents the signal levels for generating an up or down count for the circuitry of FIG. 10;

FIG. 12 is an alternate mounting configuration for the platform members;

FIG. 13 is a cross-sectional view along lines 13—13 of FIG. 12; and

FIG. 14 is another drive mechanism for moving the platform assembly according to the invention.

DESCRIPTION OF PREFERRED PARTICULAR EMBODIMENTS

Figure 1:
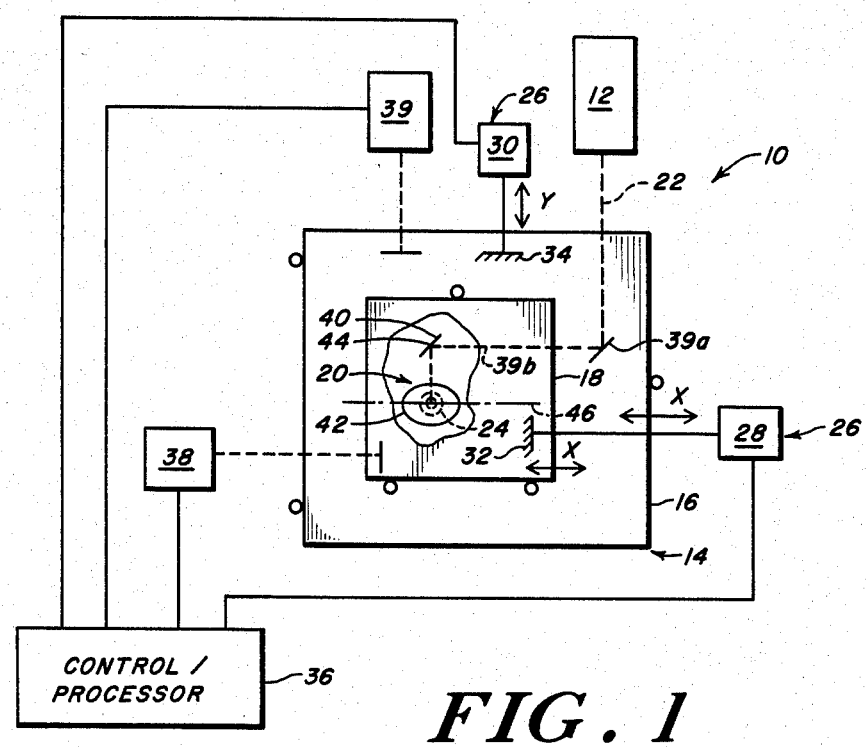
FIG. 1 is a schematic block diagram of mechanical and electrical elements according to a preferred embodiment of the invention.
Figure 2:
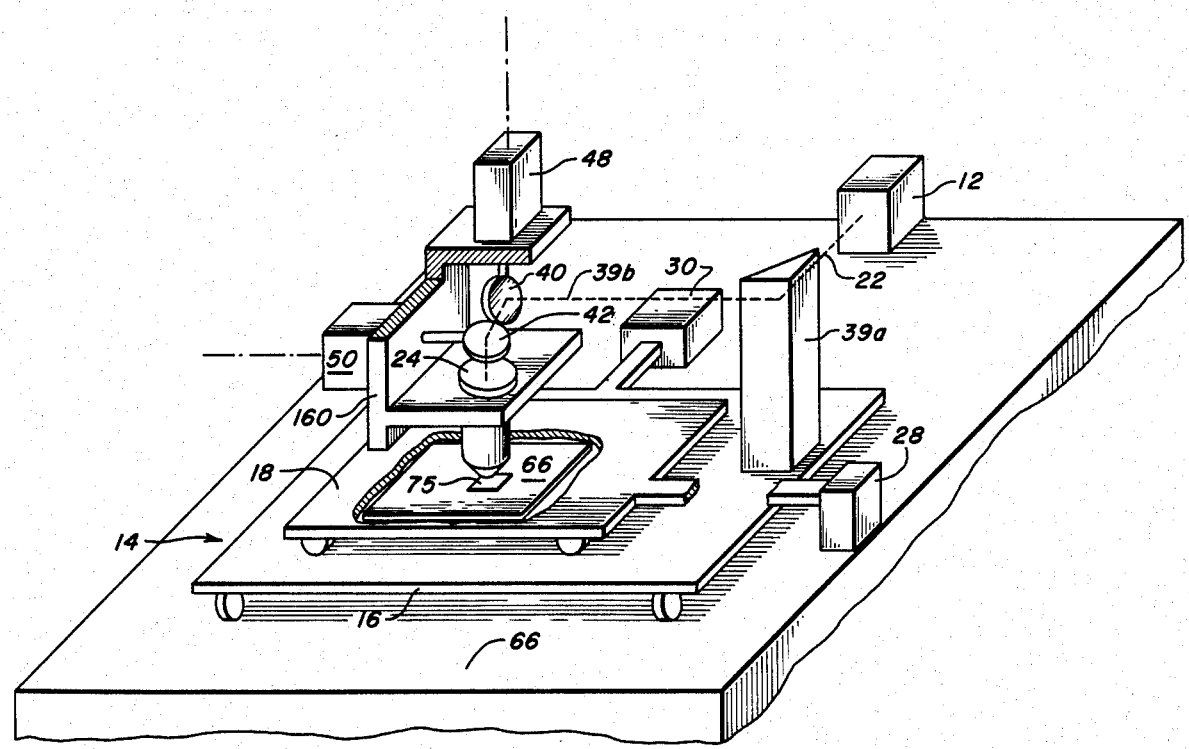
FIG. 2 is a schematic perspective view of the mechanical assembly according to a preferred embodiment of the invention.

Referring to FIGS. 1 and 2, an apparatus 10 for accurately positioning a focused energy beam on a semiconductor surface has a beam source 12 of electromagnetic energy, typically a laser source, directed toward a platform assembly 14. The platform assembly 14 has a first platform stage 16 which moves in a first coordinate direction and a second platform stage 18 which moves in a second coordinate direction. In the illustrated embodiment, the first movement direction corresponds to the Y axis of a rectilinear coordinate system and the second movement direction corresponds to the X axis of the rectilinear coordinate system. In other embodiments of the invention the coordinate axes need not be normal to each other and other coordinate systems, such as a polar coordinate system, could be employed.

The second platform stage is supported on and moves relative to the first platform stage. Supported on the second platform stage is a mirror assembly 20 which deflects an incident laser beam 22 from a direction substantially parallel to the plane of movement of the platform assembly to a direction normal thereto and toward the semiconductor surface. An optical system 24, in the path of the energy beam directed toward the surface of the semiconductor, focuses that energy onto the semiconductor surface.

The platform assembly moves in response to a drive assembly 26. In the illustrated embodiment, the drive assembly includes an "X" drive member 28 and a "Y" drive member 30. The drive members are mechanically connected to the respective stages 18 and 16 at 32 and 34 respectively. The "X" and "Y" drive members 28 and 30 operate under the control of a control processor 36. The control processor is preferably a microprocessor based unit operating to accurately control the position of the first and second stages. A first and a second position feedback signal generation element (38 and 39 respectively) are provided for determining the position of the platform assembly along each axis. These elements, which are typically interferometer based position measuring systems, provide accurate position information to the control processor 36.

Referring still to FIGS. 1 and 2, the laser beam 22 from laser 12 is preferably directed substantially parallel to the direction of movement of the first platform member 16 and is reflected, by a 45° mirror 39a, mounted on platform 16, along a direction 39b substantially parallel to the direction of movement of the second platform member 18.

The mirror assembly 20, in the illustrated embodiment, has two mirrors 40 and 42 for deflecting the incoming laser beam along direction 39b first in a direction toward the optical system 24 (by mirror 40) and then down into the pupil of the optical system for focusing the beam onto the semiconductor surface (by mirror 42). The mirrors 40 and 42 are preferably rotatable about rotation axes 44 and 46 respectively (see FIG. 5). Axis 44 is normal to the surface of the semiconductor and axis 46 is generally parallel to the surface of the semiconductor. In other embodiments of the invention, other mirror assemblies can be employed; for example, a single mirror supported in a gimbal assembly similar to a gyroscope mounting assembly can be employed. The illustrated mirrors 40 and 42 are rotated about their respective axes by galvanometer drive members 48 and 50 (FIG. 2). The galvanometer drive members operate in response to controlling signals from the control processor 36 in a manner similar to that by which the "X" and "Y" drive members 28 and 30 are controlled.

Figure 3:
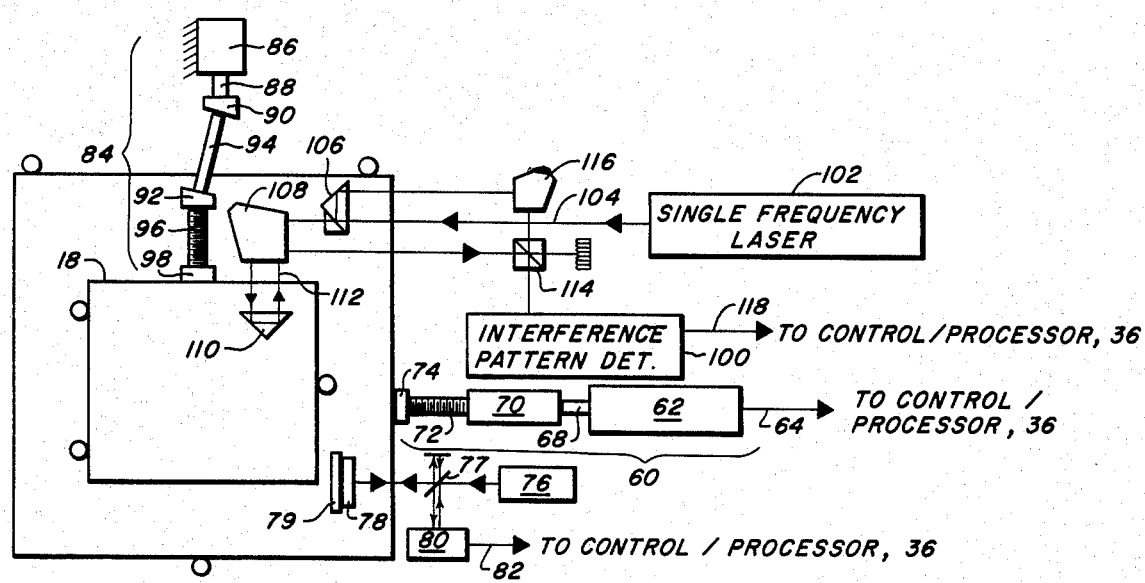
FIG. 3 is a top plan view of a drive mechanism and position measurement mechanism of the apparatus according to a particular embodiment of the invention.

Referring now to FIG. 3, the first stage 16, which can be driven in many ways known in the art, is here positioned using a screw positioning drive assembly 60. Screw positioning drive assembly 60 has a drive member 62 electrically connected over a line 64 to the control processor 36. Drive member 62 is secured and supported by the apparatus bed 66 which supports the entire apparatus 10. Thus, the drive member 62 provides a stable and fixed reference from which to drive the first (or "Y") platform stage. The mechanical output of drive member 62 rotates a shaft 68 coupled through a coupling member 70 to a threaded screw element 72. Element 72 engages an internally threaded block member 74 integral with first stage 16. Thus, as shaft 68 is rotatably driven by drive member 62 in response to signals over line 64 from the control processor 36, the first stage 16 moves in a first movement direction which, in the illustrated embodiment, lies in a movement plane parallel to the surface of the semiconductor chip 75 (FIG. 2) onto which energy will be focused.

The position of first stage can be determined relative to a fixed reference position using any of a number of techniques. One preferred and illustrated technique employs a laser 76 whose beam is directed, through a half-silvered mirror 77, at a flat mirror 78 mounted on the first stage. Preferably, mirror 78 is mounted in a precision adjustable mount 79 to allow adjustment so that the direction of the reflected beam is almost opposite the direction of the incident beam. The beam reflected from the flat mirror 78 provides a signal which can be "beat" with the original the laser signal and can be detected by an interference pattern detector 80 as is well known in the art. The output of the interference pattern detector 80 is directed to the control processor over lines 82. Thereby, the exact position of the first stage can be controlled through the effective feedback loop provided by the positioning drive assembly 60 and the interference pattern detector 80.

In like manner, the position of the second (or "X") stage 18 can be controlled and monitored. Thus, a second stage screw positioning drive assembly 84 has a drive member 86, an output shaft 88, flexible couplings 90 and 92 connected by a shaft 94, and a threaded screw element 96. The threaded screw element 96 connects to an internally threaded block member 98 which is integral with the stage 18. The provision of flexible shaft couplings, according to this embodiment, allows for accurate positioning of the second (or "X") stage even though its "Y" position may vary over the field of the semiconductor surface.

The position of the "X" stage 18 can be determined in a number of ways; however an interference pattern detector 100 is preferably employed for accurately determining the X position. Although an interference measurement system similar to that used in connection with stage 16 could be employed here, a different system is described and disclosed to not only show the flexibility available in the described embodiment but also to provide an alternate construction which may be necessary depending upon the physical environment in which the equipment is operating. Thus, in this illustrated embodiment, a single frequency laser 102 provides an output beam 104 which is directed toward a first prism 106 and a first Penta Prism 108. The beam is deflected by Penta Prism 108 toward a retroreflector 110 mounted on the second stage. A returning beam 112 from the retroreflector 110 is directed toward a beam splitting element 114. The beam splitting element acts to combine a fixed reference signal, provided by prism 106 to a Penta Prism 116, and the returning beam 112 from the second stage. The result is an interference pattern input to detector 100. The electrical output of detector 100 over lines 118 is directed to the control processor 36. Thus, the control processor has available the precise position of the first and second stages along their "Y" and "X" axes respectively, to position the stages as required using the first and second stage positioning assemblies.

Figure 4:
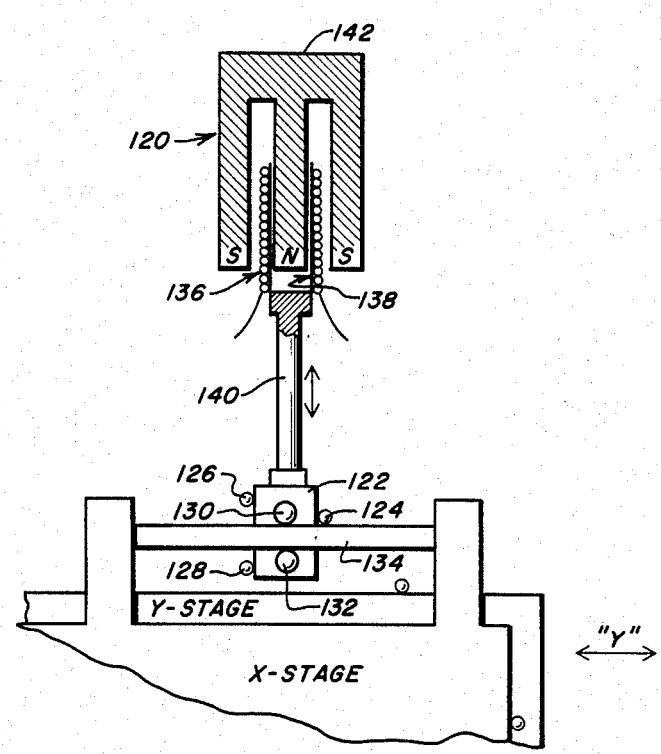
FIG. 4 is a plan view of an alternate apparatus for driving the X stage according to a second particular embodiment of the invention.

In an alternate embodiment, instead of using the flexible shaft couplings described in connection with the FIG. 3 embodiment, and referring to FIG. 4, a voice coil linear motor 120 can be employed to mechanically control the position of either the "X", or the "Y" stage. Thus, in this embodiment, the voice coil linear motor 120 shown in cross section in FIG. 4, provides a linear drive to a block member 122 constrained to move in a direction parallel to the movement of the second stage by roller members 124, 126, and 128. Block member 122 further has integral therewith roller members 130 and 132 which engage a bar 134 integral with the X stage and directed parallel to the "Y" direction. Thus, as the first (or "Y") stage moves in the "Y direction" the bar 134, which is a precision stock, moves freely in the Y direction along therewith. However, movement in the X direction is controlled totally by the voice coil linear motor 120 and the arrangement described herein "allows" for the "Y" movement through the rollers 130, 132, bar 134 structure.

As shown in cross section in FIG. 4, the voice coil linear motor 120 effects movement of the "X" stage 18 by excitation of a wire coil 136 wound about a hollow shaft 138 integral with a solid shaft 140. The hollow shaft fits over a pole of a permanent magnet 142 and by varying the current through the coil 136, the position of the coil and hence of the shaft 140, relative to the position of the permanent magnet, is precisely controlled.

Referring now to FIG. 5, the mirror assembly 20 has first mirror 40 supported by the galvanometer drive member 48 through a galvanometer shaft 156 and a mirror mounting shoe 158. The rotation axis 44 of this first galvanometer drive member is normal to the plane of movement of the first and second stages and hence is normal to the surface of the semiconductor 77. The galvanometer drive member 48 is mounted on a galvanometer mounting bracket 160 which is securely supported and mounted on the second stage 18. The drive member 48 is secured to the bracket by four galvanometer mounting screws 162 and shaft 156 is positioned in a ball bearing arrangement 164 within the galvanometer drive member 48.

In a similar manner, the second mirror 42 is supported and rotated by the second galvanometer drive member 50. The mirror 42 is secured to a shaft 168 of member 50, accurately positioned by a ball bearing arrangement 170 in the galvanometer drive 50, by a mirror mounting shoe 172. The galvanometer drive member 50 is mounted to the bracket 160 by four screws in a similar manner to the mounting of member 48 to the bracket. The rotation axis 46 defined by galvanometer drive member 50 is substantially parallel to the movement plane of the platform stages 16 and 18, and in the illustrated embodiment, is parallel to the direction of movement of the "X" stage.

The mirrors 40 and 42 have an operational interrelationship which allows the laser beam 22 incident thereon to be deflected from a direction which is substantially parallel to the movement plane of the first and second stages to a direction which is substantially normal to the surface of the semiconductor. In the illustrated embodiment, the mirrors are mounted so that the deflected laser beam, now directed substantially normal (within a solid cone of about ±3° of arc) to the semiconductor surface, passes through the optical system 24 which is adapted to focus the collimated energy beam incident thereon onto the surface of the semiconductor wafer 75 as a cell of focused energy. The optical system 24 is arranged for precision mounting to the bracket 160 and is thus effectively supported by and moveable with the second stage 18. Typically, the optical system can be a microscope objective for example a 10× Melles Griot 04 OAP 003 microscope lens system which is commercially available, reasonably priced, and of high quality.

Referring to FIG. 6, which is a view looking "up" from the semiconductor surface and in which the bracket and the galvanometer drive elements have been omitted for clarity, the incoming laser beam 22 (which could have been deflected, for example, by the reflecting mirror element indicated at 39a mounted on the first stage,) is directed first to the first mirror 40 and from it onto the second mirror 42. Mirror 42 directs the energy beam "down" into and through the microscope objective of the optical system 24 and then onto the semiconductor surface. By changing the position of the first mirror 40 or the second mirror 42, the position of the focused energy cell on the semiconductor surface can be moved in a controlled manner. Thus, each galvanometer 48 and 50 communicates electrically with the control processor 36, galvanometer drive member 48 over a line 182, and galvanometer drive member 50 over a line 184. In this manner very small excursions of the focused energy cell can be made using the first and second galvanometer drive systems. These systems have low inertia and high accuracy and provide high speed movement of the laser beam over a limited field of view (as defined by the optical system 24) on the semiconductor surface.

The galvanometer drive members operate differently than the first and second stage servo drive members. This is in part a result of the different method of keeping track of the angular positions of the respective mirrors. Thus, the first and second platform stages use interferometer detectors to provide clear and unequivocable feedback data regarding the position of the stage. The same interferometer measurements are not available with respect to rotation and hence angular position of the galvanometer members. What is available, however, is an integral angular position transducing feedback element which provides the angular position (of the respective mirror) with respect to an internal reference to an accuracy of one part in ten to the fourth. However, the exact position of the energy cell, which is affected by the sensitivity of the angular position transducer, the nonliearities of the angular position transducer, etc., is not known. As a result, it is important to be able to calibrate the galvanometer drive assemblies to know the extent of movement of a focused energy cell on the semiconductor surface as a function of the angular movement of the X and Y mirrors.

Typically, the method for calibrating the movement of a galvanometer beam positioner has been to "scan" a dimensionally known and aligned reference surface, placed in the plane of the focused spot, to thereby provide a measure or conversion factor between angular movement of the mirrors and translational movement of the focused beam along the surface of the semiconductor. This method thus relies upon accurate prior knowledge of the reference surface dimensions. According to the present invention, the galvanometer positioning assemblies can be accurately calibrated without previously measuring the reference surface by using the position measuring apparatus associated with the first and second stages. Thus, in accordance with the calibration method, a reference surface is positioned in the plane normally associated with the semiconductor surface. (The reference surface can be a semiconductor surface.) The surface should have well defined features and, in the preferred embodiment, the features are substantially aligned with the movement directions, the X and Y directions. (The features can be a single integral area of the surface, or can be two or more recognizable regions of the surface spaced apart by, for example, up to 80% or more of the field of view.) With the mirror members 40 and 42 fixed in position, the X and Y stages 18 and 16 are moved so that the feature(s) is (are) "scanned" to determine the feature dimensions of interest. The interference detectors are used for this purpose along with the feature recognition method and apparatus discussed below. After the dimensions of the features are determined, the first and second platform stages are positioned over the feature(s), are fixed in that position, and the feature measurements are made again using the galvanometer controlled mirrors. Thereafter, the two measurements are compared, using the process controller arithmetic capabilities, and the calibration of the galvanometer positioning system is accurately determined. The calibration procedure, as noted above, uses the following feature recognition method and apparatus for determining the feature boundaries. Referring to FIG. 7, the energy beam 22, from laser 12, is directed toward and focused on the reference surface (as shown in FIG. 1). The laser output, however, now passes through a beam splitting mirror 186 and a portion of the energy incident on the mirror (50% in the illustrated embodiment) passes through the mirror 186 and is directed onto the surface to be "scanned". The reflected portion of the energy incident upon the mirror 186 is absorbed by an absorption element 188. The energy reflected by the reference surface, such as the integrated circuit itself, is directed back to the beam splitting mirror 186 and divides into two portions. One portion passes through the mirror and is absorbed by a second absorber 189. The other portion is reflected by mirror 186 and it directed through a lens 190 onto a photoreceiver, for example, a photodiode 192. The output of the photodiode 192 is amplified by an amplifier 194 and the electrical output of the amplifier is connected to the process controller 36 over a line 196. It is this output, representing reflected energy from the reference surface, which provides the necessary information regarding the boundaries of the "feature" and which allows a determination of the width of the feature using first, movement of the "X" and "Y" platform stages (with the galvanometer mirror assembly held in a fixed position), and then movement of the mirror assembly to measure the feature boundaries (with the platform stages 16 and 18 held in fixed position).

In operation then, the translational X-Y measurement is made of a feature, under the control of control processor 36. Using the position measurement system and signal amplitude measuring circuitry to define the boundaries or edges of the feature, based upon the energy reflected from the semiconductor surface, a precise dimensional measurement of the feature can be attained. Importantly, in addition, the exact location of the feature can be determined as well. Thereafter, the translational X-Y beam positioning system is moved to a position directly over the feature and the galvanometer system is used to measure the same feature. Now however, the measurement data is obtained in terms of the angular change of the galvanometer mirrors. Importantly, it is also known that the feature being measured is the same feature measured by the X-Y translational positioning system. Thereby, a conversion can be obtained for calibrating the angular movement of the mirrors to the actual movement of the energy cell on the surface of the integrated circuit.

Figure 8:
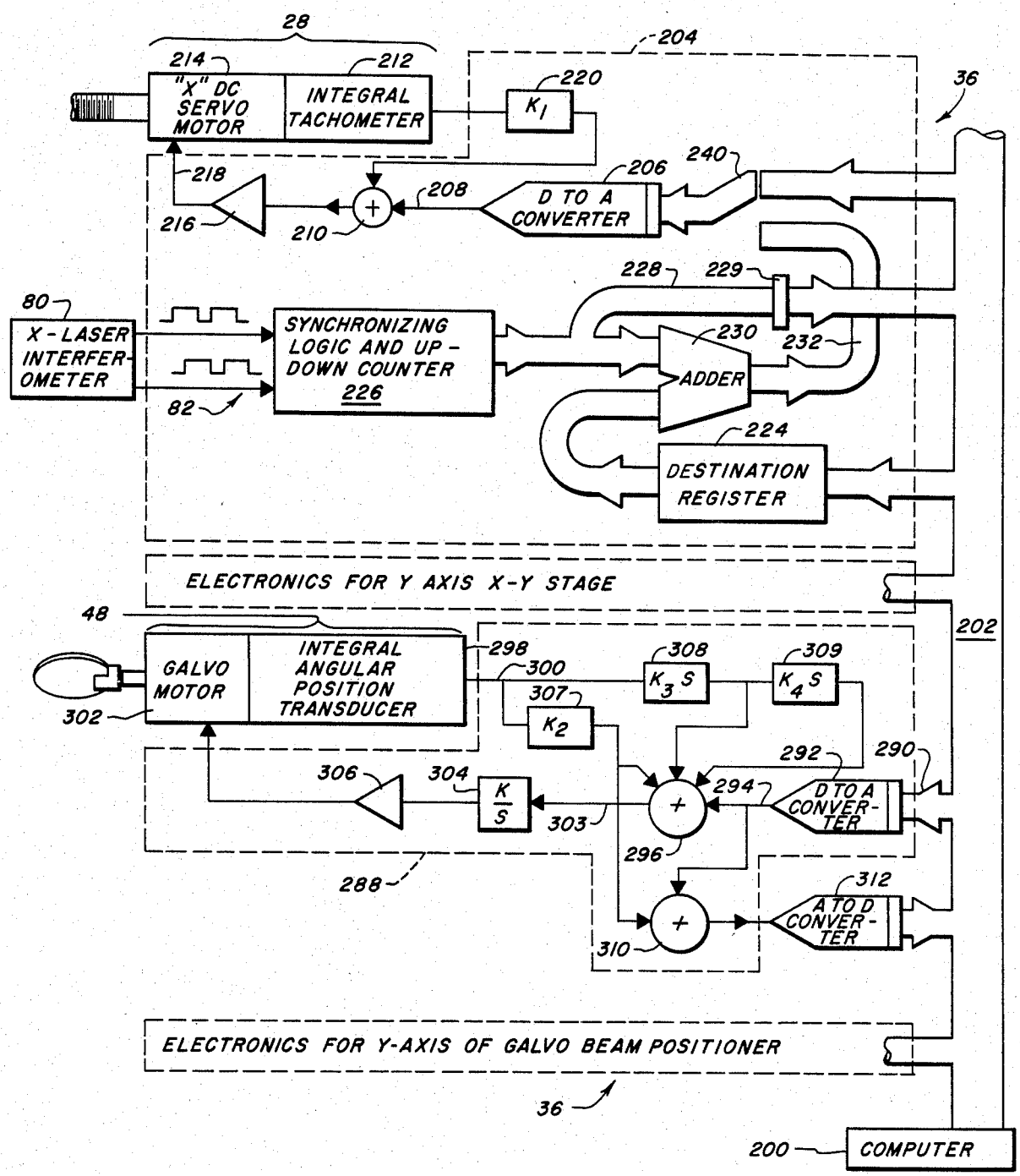
FIG. 8 is a schematic electrical block diagram according to a preferred embodiment of the invention.

Referring now to FIG. 8, the controller processor 36 has a data processing element which can be for example, a digital computer 200. The computer 200 communicates over a computer data bus 202 to the electronics which control and provide feedback information for driving the first and second stage drive members 28 and 30, and the galvanometer drive members 48 and 50. Since the electronics for the first and second stage drive members are identical in function, only the electrical circuitry 204 for the second or X axis drive member 28 is described. The electrical circuitry 204 has a digital-to-analog converter 206 for converting data processor positioning control signals, received from the computer bus, from their digital signal representation to analog control signals. The output of the digital-to-analog converter (DAC) over a line 208 is connected to an adder represented at 210. A second input to the adder is a feedback signal from an integral tachometer 212 which forms part of the drive member 28. The drive member 28 also includes a DC servomotor 214. The output of the adder, which represents the difference between the computer supplied data and the rate of movement of the "X" stage, is amplified by a power current amplifier 216. The output of amplifier 216 is applied to the servomotor 214 over a line 218. A scale factor multiplier, represented by a scaler multiplier $K_1$ at 220, provides stability and control over this feedback loop configuration.

The computer supplied data, to the DAC 206, is not the desired end position of the "X" stage but represents the difference between the end position and the stage present position as measured by the interference detector 80. Thus, the computer 200, in this mode of operation, must constantly update the input to the digital-to-analog converter 206.

As an alternative to continuously receiving position control signals from the computer over bus 202, the signals from the interferometer detector control system over lines 82 can be employed internally either for maintaining the first platform stage at a known end position or for moving the stage over small distances. In this mode of operation, a destination address is available from the computer over bus 202 and is stored in a digital destination register 224. (Recall that the signal available to the digital-to-analog converter 206 represented the difference between the present position of the stage and the end position.) The actual position of the second platform stage, is determined by the laser interferometer detector 80 output signals provided over lines 82 to a synchronizing logic and up/down counter circuit represented in block 226. The output of the circuitry 226 represents a present position modulo $2^n$, where n is typically twelve, and is provided to both the computer data bus over lines 228 (through a register 229) and to an adder 230. The digital output of the adder, which represents the difference between the present location of the second platform stage and the destination of the platform stage, is provided over lines 232 for use by the D/A converter 206.

Thus, for the position of a multiplexing switch 240, illustrated in FIG. 8, the computer 200 has total control, subject to the capabilities of the circuitry and motor, over the movement of the second platform stage 18. This is important for positional movements greater than the range provided for by an up/down counter of circuitry 226. Thus, the computer must be involved at least once each time there is an overflow of the up/down counter of circuitry 226. The overflow condition defines the "range" of the counter. When the switch 240 is in its other ("lower position"), continuing computer attention is not necessary. This mode of operation is suitable for holding a fixed coordinate position or for moving small distances wherein overflow of the up/down counter of circuitry 226 will not occur.

Figure 9:
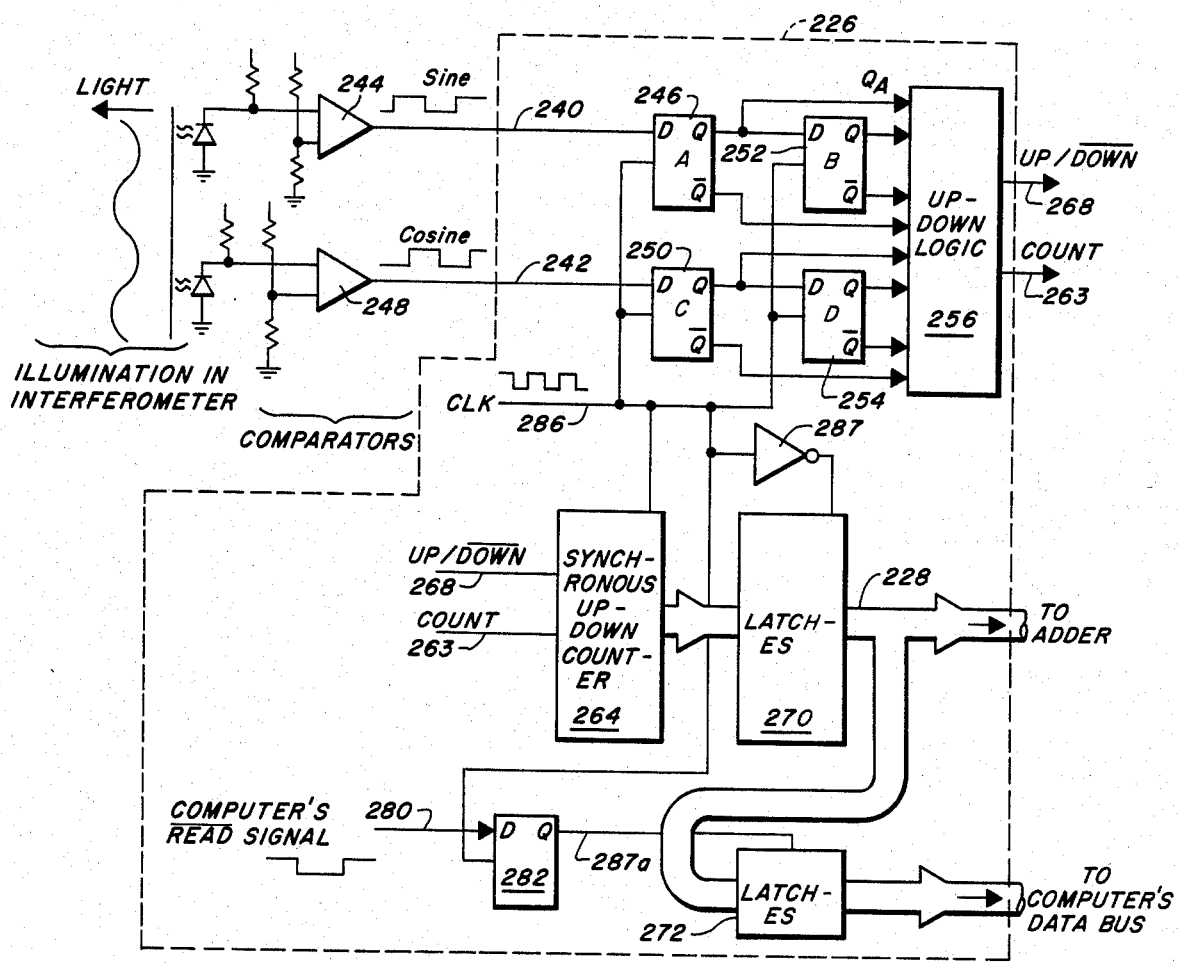
FIG. 9 is an electrical block diagram of the synchronization logic and up-down counter circuitry according to a preferred embodiment of the invention.

Referring now to FIG. 9, the synchronization logic and up/down counter circuitry 226 receives the sine and cosine output signals of the interferometer interference detector over lines 240 and 242. Line 240 connects the "sine" output of the interference detector from a comparator 244 to a first flipflop 246. The cosine output, of a comparator 248, is connected to a flipflop 250. The connections to flipflops 246 and 250 are at their "D" inputs. The "Q" outputs of flipflops 246 and 250 are connected, as shown in FIG. 9, to flipflops 252 and 254 respectively as well as to an up/down counter logic 256. The connection to flipflops 252 and 254 are at their respective "D" inputs.

Figure 10:
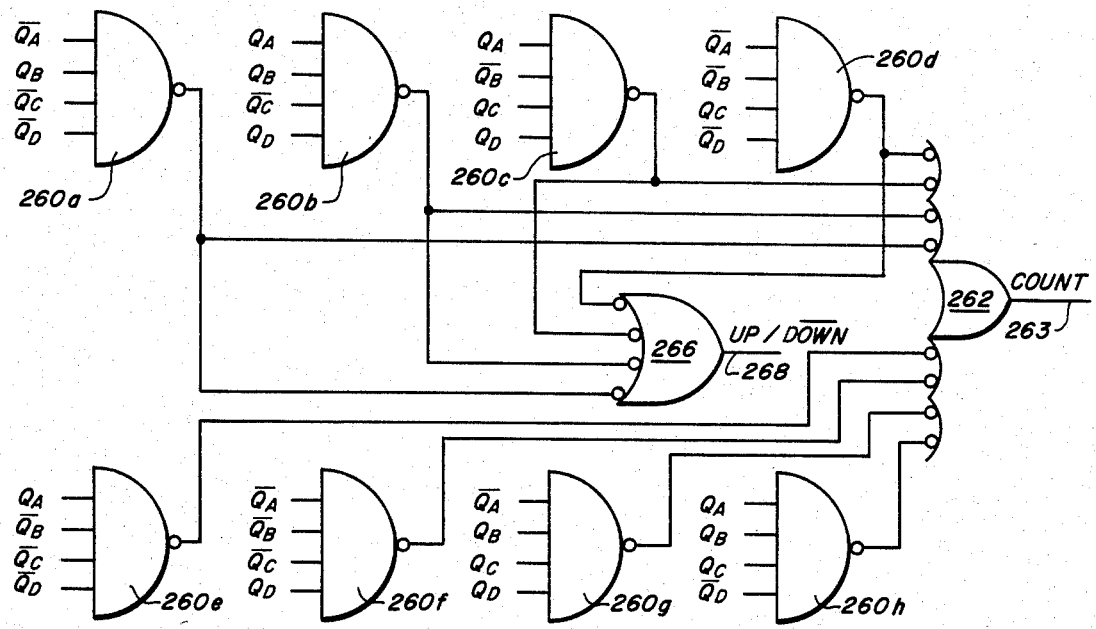
FIG. 10 is an electrical circuit diagram of the up-down logic of FIG. 9.

The up/down counter logic 256, referring to FIG. 10, has a plurality of NAND gates $260a, 260b, \ldots, 260h$, which, in combination with an eight inverting input OR gate 262, provide a count signal over a line 263 to a synchronous up/down counter 264 (FIG. 9). The direction of the count is controlled by the signal level output of a four inverting input OR gate 266 (FIG. 10) over a line 268. The output of the synchronous up/down counter is "latched" into a latching register 270, and the output of register 270 is available over lines 228 to the adder 230 and, through the latch register 229, to the computer data bus 202. Register 272 is "clocked" in accordance with the computer's READ signal (available over a line 280) through a D-type flipflop 282. Synchonous operation of the entire circuitry is controlled by a clock signal over a line 286.

Referring to FIG. 11, the synchronization logic and up/down counter circuitry 226 is premised upon the a priori knowledge that an up count occurs when any of the four conditions represented in line A (labelled COUNT UP) occur; that a downcount occurs when any of the four conditions represented in line (labelled COUNT DOWN) B occur; and that all other combinations of flipflop 246, 250, 252, 254 outputs (line C) result in no change in the up/down counter. The result is tabulated in summary form (lines D) for the combinations of outputs of flipflops 246, 250, 252, and 254.

In operation, the synchronizing clock signal over line 286 causes flipflops 246, 250, 252, and 254 to simultaneously input new data each clock cycle ("clock time"). At a time one-half cycle later, the up/down counter 264 is clocked. If a high signal appears on the count line 263, the up/down counter will increment up or down depending upon the signal level on line 268.

At a half clock cycle after the "clock time", the then output of the synchronous up/down counter is latched into registers 270. The delay in loading register 270 is implemented by using an inverter 287. Inverter 287 inverts clock signal over line 286 to provide a half clock period delay.

The output of latching register 270, over lines 228 passes through latching register 272 and appears as the output thereof so long as the signal level over line 287a remains high. When the $\overline{\text{READ}}$ signal level over line 280 goes low, however, indicating that a computer read is to occur, the signal level over line 287a also goes low. The signal over line 287a goes low at the next low to high clock transistion on lines 286. The low signal level over line 287a latches the then present count in register 270 into register 272, and this count is available to the computer 200 over data bus 202. The latch 272 is released after the $\overline{\text{READ}}$ level returns to its "high" state.

For proper implementation of the synchronization logic and up/down counter circuitry 226, the frequency of the synchronizing clock signal over line 286 must be greater than twice the maximum frequency of either the sine or cosine signals over lines 82. That maximum frequency will equal the maximum speed at which a stage moves divided by one-half the wavelength of the light used by the laser interferometer.

In summary, the synchronization logic and up/down counter circuitry 226 provides a "no count" output if the sine and cosine signals (as measured by the outputs of flipflops 246, 250, 252 and 254) are either in phase or 180° out of phase (line C of FIG. 11) out of phase, then a count signal is provided, the direction of count depending upon the phase relationship of the sine signal relative to the cosine signal.

Referring again to FIG. 8, the electronic circuitry for the X and Y galvanometer drive members are identical and hence only the electronic circuit 288 for the "X" axis galvanometer drive member 48 will be described in detail. The electronic circuit 288, like the electronic circuit for controlling the first platform stage described above, receives position data from the computer bus 202 over a line 290. The data over line 290 represents the desired destination angular position of the drive member. A D/A converter 292 converts the digital data to an analog output signal, available over a line 294, and applied to an adder represented at 296. The other inputs to the adder, as will be described hereinafter, are related to the angular position of the galvanometer drive member as indicated by the output of an integral angular position transducer 298 over a line 300. The integral angular position transducer 298, in combination with a galvo motor 302, form the galvanometer drive member 48. The analog signal output of the adder over a line 303 is integrated as represented by a block 304 and the output of the integrator 304 is delivered to and amplified by a power current amplifier 306. The output of the power amplifier is applied directly to the galvanometer motor 302.

As shown in FIG. 8, the position output of the position transducer 298 over line 300 is applied, according to a differential equation $$K_2 + K_3 \frac{d}{dt} + K_3 K_4 \frac{d^2}{dt^2}$$

to the adder represented at 296. The differential equation is implemented by elements 307, 308, and 309. Scalar amplifier 307 and differentiators 308 and 309 are well known, commercially available elements. This circuit configuration provides a stable feedback control loop for accurate positioning of the galvanometer mounted mirror. The output of the integral angular position transducer is also applied to a second adder represented at 310 whose other input is the output of the D/A converter. The sum (difference) of these two signals, representing the error in position, is applied to an analog-to-digital converter (ADC) 312. The ADC 312 provides its digital output over lines 314 to the computer bus 202. In this manner, the computer provides direct and continuing control over the position of the galvanometer motors and hence the mirror assembly.

Referring to FIGS. 12 and 13, in another particular embodiment of the invention, the platform stages 16, 18 can each be mounted and supported on a pair of straight, ground, hardened, lapped rigid rods 330. Rods 330 for the first or "Y" platform stage are secured to the apparatus base 66, and rods 330 for the second or "X" platform stage are securely supported by the first platform stage. The rods 330, which have a circular cross section, support each respective stage using ball or roller bearing assemblies 332, 334, 336, 338, and 340. Each ball bearing or roller bearing assembly has a "springy" bracket type support 342, 344, 346, 348 and 350 for maintaining a compliant, controlled pressure contact between roller pairs and the rod. Each roller bearing pair thus has one roller integral with the platform stage, for example, roller 334a or 350a (FIG. 13), while the other roller of the pair, for example, roller 334b or 350b is connected to the springy bracket support. The springy support can be provided by a relatively thinner, compliant portion of the bracket, such as at 334c or 350c. To maintain accurate control over the position and alignment of the stage, the roller assemblies 336, 338, and 340 are oriented at 90° to the roller assemblies 332, 334. This construction provides sufficient vertical and lateral support for the roller assemblies to accurately control the location of each stage.

The apparatus thus described advantageously combines the galvanometer positioning system with the X-Y beam positioning system to provide an apparatus having the advantages of both and the disadvantages of neither. Further, the described apparatus provides advantages not available by either system operating independently. Thus, the slower settling X-Y beam positioning system can be moved from one field to another as needed and the fast, low inertia, galvanometer system provides the high speed needed at each "field of view". Correspondingly, the X-Y beam positioning system can be made heavier (and hence slower), thereby reducing vibration from this portion of the system so that it does not pose a limit to positional accuracy and spot size at the surface of the semiconductor. Also the X-Y beam positioning system need not move (and settle) to the position at which repair is desired. It is only necessary that it be close to the desired position and that its actual position be accurately known (for example, using the interferometer). Further, of great importance, the lens diameter and hence focal length can substantially reduced from that typically needed for the galvanometer system itself. Thereby, the lens can be purchased "off the shelf" at both reasonable price and high quality. Thus, a typical lens can have a field of view of less than two millimeters, for example, 1 millimeter, and a short focal length less than 20 millimeters, for example, 16 millimeters. Other elements of the described apparatus are similarly relatively easily manufactured. For example, the galvanometer mirrors can be 0.7" in diameter, by 0.15" thick, and ground flat to 1/20 of a wavelength. The galvanometer drive members 154 and 156 can be for example General Scanning type G-300PDT galvanometers.

It should also be apparent that one need not necessarily move the first and second stages in an orthogonal rectilinear coordinate system. Thus, a polar coordinate system, a non-orthogonal coordinate system, etc., can be employed, so long as the field of view which is available to the platform positioning system is sufficient to cover the integrated circuit being "repaired". Thus so long as the first and second stages can position the galvanometer system over the entire semiconductor circuit (the galvo system then providing the positioning movement within a field), substantially any translation coordinate system can be employed. In addition, it is similarly unnecessary to use separate X and Y drivers for the system. Thus, a parallelogram drive mechanism can be employed; or for example, a four bar linkage 200, such as that shown schematically in FIG. 14, can be employed.

Additions, subtractions, deletions, and other modifications of the disclosed preferred and particular embodiments of the invention will be apparent to those practiced in the art and are within the scope of the following claims.

What is claimed is:

1. Apparatus for accurately positioning focused electromagnetic energy on a semiconductor surface comprising
   a beam source of electromagnetic energy,
   a movable platform assembly,
   means for moving said platform assembly in first and second directions parallel to a movement plane,
   a rotatable mirror means supported by said platform assembly,
   an optical system supported by said platform assembly for focusing an energy beam incident thereon on said semiconductor surface,
   means for directing said beam source of electromagnetic energy onto said mirror means,
   said mirror means deflecting said incident energy beam source to a direction wherein the deflected beam passes through said optical system for focusing said beam on said semiconductor surface, and
   a control means for controlling the position of said platform assembly and of said mirror means for accurately positioning said beam source onto said semiconductor surface as a cell of focused energy.

2. Apparatus for accurately positioning focused electromagnetic energy on a semiconductor surface comprising
   a beam source of electromagnetic energy,
   a movable first platform member,
   means for moving said first platform member in a first direction parallel to a movement plane,
   a movable second platform member supported by and movable on said first platform member,
   means for moving said second platform member in a second direction parallel to said movement plane,
   a rotatable mirror assembly supported by said second platform member,
   an optical system supported by said second platform member for focusing an energy beam incident thereon onto said semiconductor surface,
   a beam directing assembly for directing the beam source of electromagnetic energy onto said rotatable mirror assembly,
   said rotatable mirror assembly deflecting the energy beam incident thereon from a direction substantially parallel to the movement plane to a direction wherein said deflected beam passes through the optical system for focusing the beam onto said semiconductor surface, and
   a control processing means for controlling the position of the first and second platform members and of the rotatable mirror assembly for accurately positioning the beam source onto the semiconductor surface as a cell of focused energy.

3. Apparatus for accurately positioning focused energy on a semiconductor surface comprising
   a beam source of electromagnetic energy,
   a movable first platform member,
   means for moving said first platform member in a first direction parallel to a movement plane,
   a movable second platform member supported by and movable on said first platform member,
   means for moving said second platform member in a second direction parallel to said movement plane,
   a first and a second rotatable mirror means supported by said second platform member,
   an optical system supported by said second platform member for focusing an energy beam incident thereon on said semiconductor surface,
   means for directing said beam source of electromagnetic energy onto said first mirror means,
   said first and second mirror means having an operational interrelationship for deflecting said incident energy beam from a direction substantially parallel to said movement plane to a direction wherein said deflected beam passes through said optical system for focusing said beam on said semiconductor surface, and
   a control means for controlling the position of said first and second platform members and of said first and second mirror means for accurately positioning said beam source on said semiconductor surface as a cell of focused energy.

4. The positioning apparatus of claim 3 wherein said directing means comprises
   a first fixed mirror means supported by said first platform member for deflecting said beam source of energy in the direction of movement of said second platform member and onto said first rotatable mirror.

5. The positioning apparatus of claim 4 wherein
   first rotatable mirror has a single axis of rotation, said single axis being substantially normal to said movement plane, and
   said second rotatable mirror is capable of rotation about an axis parallel to said movement plane.

6. The positioning apparatus of claim 3 wherein said control means comprises
   a positioning data processor,
   said first platform member moving means being responsive to a first platform position control signal from the positioning data processor for moving said first platform member,
   said second platform member moving means being responsive to a second platform position control signal from the positioning data processor for moving said second platform member,
   a first mirror drive means for accurately controlling the angular position of said first rotatable mirror in response to a first mirror position control signal from the positioning data processor, and
   a second mirror drive means for accurately controlling the angular position of said second rotatable mirror in response to a second mirror position control signal from said positioning data processor.

7. The positioning apparatus of claim 6 further comprising
   means for mounting said first and second mirror drive means in a fixed position on said second platform member for movement therewith,
   means for mounting said first and second platform member moving means in respective fixed positions, and
   means for coupling a mechanical position output of said second platform member moving means to said second platform member for movement thereof.

8. The positioning apparatus of claim 1 wherein said control means further comprises
   means for accurately determining the position of said platform assembly relative to a fixed reference position at least along a first axis and a second axis parallel to said movement plane.

9. The positioning apparatus of claim 8 wherein said position determining means comprises
first and second interferometer measuring means for determining the position of said platform assembly along said axes respectively.

10. The positioning apparatus of claim 1 wherein said optical system comprises
a lens element having
a field of view less than two millimeters, and
a focal length less than 20 millimeters, and
means for mounting said lens element with its optical axis normal to said semiconductor surface.

11. The positioning apparatus of claim 1 wherein said mirror means includes
means for deflecting said incident energy beam source to a direction within a solid cone having a subtended angle less than 6 degrees of arc and having an axis normal to said semiconductor surface.

12. In an apparatus for accurately positioning a focused energy beam on a semiconductor surface, said apparatus comprising
a beam source of electromagnetic energy,
a platform assembly movable along first and second directions parallel to a movement plane,
a rotatable mirror assembly supported by said platform assembly,
an optical system supported by said platform assembly for focusing an energy beam incident thereon onto said semiconductor surface,
means for directing said beam source of electromagnetic energy onto said mirror means,
said rotatable mirror assembly deflecting said directed beam source to a direction wherein said mirror assembly deflected beam passes through said optical system and is focused onto said semiconductor surface, and
a control means for controlling the position of the platform assembly and said mirror assembly for accurately positioning said beam source as a focused cell on said semiconductor surface,
a method of accurately calibrating said rotatable mirror assembly comprising the steps of:
positioning a measurement surface having defined features in the plane of focus of said optical system,
measuring at least one feature of said measurement surface by moving said platform assembly while maintaining said rotatable mirror means in a fixed position relative to the optical system,
measuring said at least one feature of the measurement surface by moving said rotatable mirror assembly while maintaining said platform assembly in a stationary condition, and
comparing said platform assembly originated measurement with said rotatable mirror assembly originated measurement for determining the calibration of said rotatable mirror assembly.

13. The method of claim 12 further comprising the steps of
aligning said at least one feature with one movement axis of said platform assembly,
measuring said feature substantially solely in said one movement axis by movement of said platform assembly, and
measuring said feature substantially solely in said one movement axis by moving said rotatable mirror assembly to traverse said focused cell solely in said movement axis direction.

* * * * *